April 12, 1932. W. J. TATE 1,853,943
FOLDING VISOR
Filed April 10, 1929
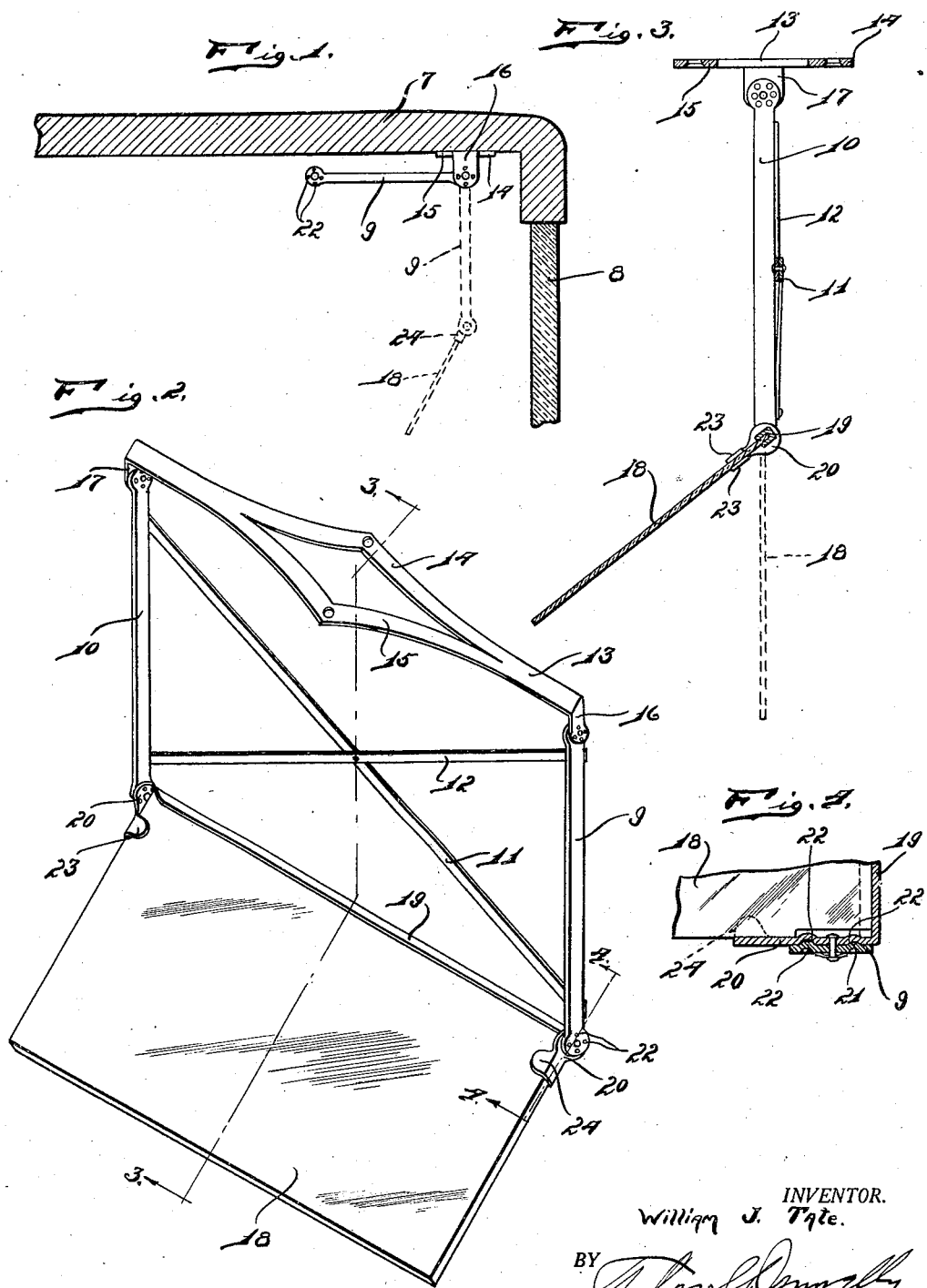
INVENTOR.
William J. Tate.
BY
ATTORNEY.

Patented Apr. 12, 1932

1,853,943

UNITED STATES PATENT OFFICE

WILLIAM J. TATE, OF FLINT, MICHIGAN

FOLDING VISOR

Application filed April 10, 1929. Serial No. 353,905.

My invention relates to a new and useful improvement in a folding visor adapted for use on vehicles such as automobiles and particularly adapted for use on automobiles having closed bodies.

It is an object of the present invention to provide a light filtering shield which may be moved into the line of vision of the driver of the vehicle at will so as to protect the vision of the driver from light glares.

It is another object of the invention to provide a device of this class which will be simple of structure, economical of manufacture and highly efficient in use.

Another object of the invention is the provision of a device of this class which may be moved, when in inoperative position, to a position where it will not obstruct the vision of the driver and which, when moved to operative position, will afford a maximum protection.

Other objects will appear hereinafter.

The invention consists in the combination and arrangement of parts hereinafter described and claimed.

The invention will be best understood by a reference to the accompanying drawings which form a part of this application and in which, Fig. 1 is an elevational view of the invention showing it applied.

Fig. 2 is a perspective view of the invention.

Fig. 3 is a view taken on line 3—3 of Fig. 2.

Fig. 4 is an enlarged sectional view taken on line 4—4 of Fig 2.

In the drawings, I have illustrated the invention applied to a vehicle having a body roof 7 with a transparent closure 8 mounted in the forward end thereof. The invention comprises a frame having side rails 9 and 10 which are connected and reinforced by diagonally extending braces 11 and 12. A cross bar 13 is provided with outwardly bowed portions 14 and 15 through which securing means may be projected for fastening the device to the under surface of the roof 7. Downwardly directed ends 16 and 17 are formed on opposite ends of the cross bar 13, these lugs being corrugated. The upper ends of the side rails 9 and 10 are pivotally connected to the ends 16 and 17. A light filtering member 18 is provided with the frame 19 having lugs 20 formed thereon which are pivotally connected to the lower ends of the side rails 9 and 10. The lower end of the side rails 9 and 10 are provided with bosses 21 projected inwardly and adapted to engage in pockets 22 formed on the lugs 20. Laterally extending lugs 23 and 24 are formed on the frame 19 and bent into engagement with the member 18, thus securely mounting the member in position in the frame, one of the longitudinal edges of the member 18 being embraced by a channel shaped portion of the frame.

In use, the device is mounted on the roof 7 as indicated in Fig. 1 and when it is desired to move the device to inoperative position, the member 18 is folded upon the frame having the side rails 9 and 10 and this frame is then swung into horizontal position as shown in Fig. 1. The corrugations or bosses serve to prevent undue movement of the frame downwardly into operative position. When it is desired to use the device, the frame having the side rails 9 and 10 is swung downwardly into the position shown in dotted lines in Fig. 1 and the shielding member 18 may then be swung as shown in dotted lines in Fig. 1 to the desired position of angularity so that the driver may see through the member 18. It is preferred that this member 18 be formed from a colored transparent material such as isin-glass or glass colored green, brown or any other desired color which will filter the light rays and prevent an impairment of the vision of the driver because of the glare of the light of approaching or following vehicles.

With a device constructed in this manner, an economical structure is afforded and one which is quite durable in use.

While I have illustrated and described the preferred form of my invention, I do not wish to limit myself to the precise details of structure shown but desire to avail myself of such variations and modifications as come within the scope of the appended claims.

Having thus described my invention, what

I claim as new and desire to secure by Letters Patent is:

1. A visor of the class described, comprising: a horizontally disposed cross bar; downwardly turned ends on said cross bar the upper surface of said cross bar being free from upward projections; side rails pivotally connected at one end to said downwardly turned ends; diagonally extending braces connecting said side rails; and a shielding member swingably mounted on the opposite ends of said side rails and swingable between and into alignment with said side rails, said diagonally extending braces, when positioned beneath said side rails, upon swinging of said side rails into horizontal position, preventing downward swinging of said shielding member.

2. A visor of the class described, comprising: a horizontally disposed cross bar; downwardly turned ends on said cross bar the upper surface of said cross bar being free from upward projections; side rails pivotally connected at one end to said downwardly turned ends and adapted to swing into a horizontal position; diagonally extending braces connecting said side rails and lying on the under side of said side rails upon swinging of said side rails into horizontal position; a shielding member swingably mounted on the opposite ends of said side rails and adapted for lying in a single plane with said side rails, said diagonally extending braces preventing downward swinging movement of said shielding member from said plane when moved thereto and swung into a horizontal position.

In testimony whereof I have signed the foregoing specification.

WILLIAM J. TATE.